United States Patent
Lin (10) Patent No.: US 9,611,914 B2
(45) Date of Patent: Apr. 4, 2017

(54) ADJUSTING DEVICE FOR A DAMP ADJUSTMENT CYLINDER AND A VEHICULAR SHOCK ABSORBER INCLUDING THE SAME

(71) Applicant: Ted Lin, Pingtung County (TW)

(72) Inventor: Ted Lin, Pingtung County (TW)

( * ) Notice: Subject to any disclaimer, the term of this patent is extended or adjusted under 35 U.S.C. 154(b) by 166 days.

(21) Appl. No.: 14/611,300

(22) Filed: Feb. 2, 2015

(65) Prior Publication Data
US 2016/0223044 A1  Aug. 4, 2016

(51) Int. Cl.
*F16F 9/44* (2006.01)

(52) U.S. Cl.
CPC ............ *F16F 9/44* (2013.01); *F16F 2230/06* (2013.01)

(58) Field of Classification Search
CPC ........ F16F 9/44; F16F 2230/06; B60G 13/08; B60G 17/08; B60G 17/052; B60G 11/27; B60G 2202/152; B60G 2202/24; B60G 2500/10; B60G 2500/201; B60G 2600/20
USPC ...................................................... 188/322.2
See application file for complete search history.

(56) References Cited

U.S. PATENT DOCUMENTS

| | | | | |
|---|---|---|---|---|
| 5,988,332 A * | 11/1999 | Marzocchi | ........... | B60G 17/021 188/298 |
| 6,105,740 A * | 8/2000 | Marzocchi | ........... | B60G 17/021 188/298 |
| 6,112,868 A * | 9/2000 | Graham | ............... | B60G 17/002 188/318 |
| 6,412,615 B1 | 7/2002 | Perez | | |
| 7,306,079 B2 * | 12/2007 | Beck | .................. | B60G 17/0408 188/322.19 |
| 7,635,051 B2 * | 12/2009 | Beck | .................... | B60G 17/044 188/322.19 |
| 8,403,115 B2 | 3/2013 | Gartner et al. | | |
| 8,978,848 B2 * | 3/2015 | Teng | ....................... | F16F 9/342 188/266 |
| 2009/0200760 A1 * | 8/2009 | Gartner | .................. | B60G 15/12 280/5.507 |

(Continued)

FOREIGN PATENT DOCUMENTS

TW   M341643 U   10/2008
TW   M486600 U   9/2014

*Primary Examiner* — Vishal Sahni
(74) *Attorney, Agent, or Firm* — Alan D. Kamrath; Kamrath IP Lawfirm, P.A.

(57) ABSTRACT

An adjusting device includes a connecting member having a chamber. The connecting member further includes first and second openings defined in two ends thereof and communicated with the chamber. The connecting member further includes a first assembling portion in the chamber and a threaded portion in the second opening. A through-hole extends from an inner periphery through an outer periphery of the connecting member and communicates with the chamber. An adjusting member includes a pivotal end having a second assembling portion for assembling with the first assembling portion. The adjusting member further includes a passage having first and second openings respectively in two ends thereof. The first opening of the adjusting member is located in the pivotal end. A sealing cap is in threading connection with the threaded portion. A damper and a damp adjustment cylinder can be coupled to the adjusting device to form a vehicular shock absorber.

14 Claims, 9 Drawing Sheets

(56) References Cited

U.S. PATENT DOCUMENTS

2011/0017559 A1* 1/2011 Sintorn ................ B60G 13/08
188/314

* cited by examiner

ADJUSTING DEVICE FOR A DAMP ADJUSTMENT CYLINDER AND A VEHICULAR SHOCK ABSORBER INCLUDING THE SAME

BACKGROUND OF THE INVENTION

1. Field of the Invention

The present invention relates to an adjusting device for a damp adjustment cylinder and a vehicular shock absorber including the adjusting device and, more particularly, to an adjusting device permitting adjustment of a relative position between a damp adjustment cylinder and a damper of a vehicular shock absorber.

2. Description of the Related Art

Figure 1:
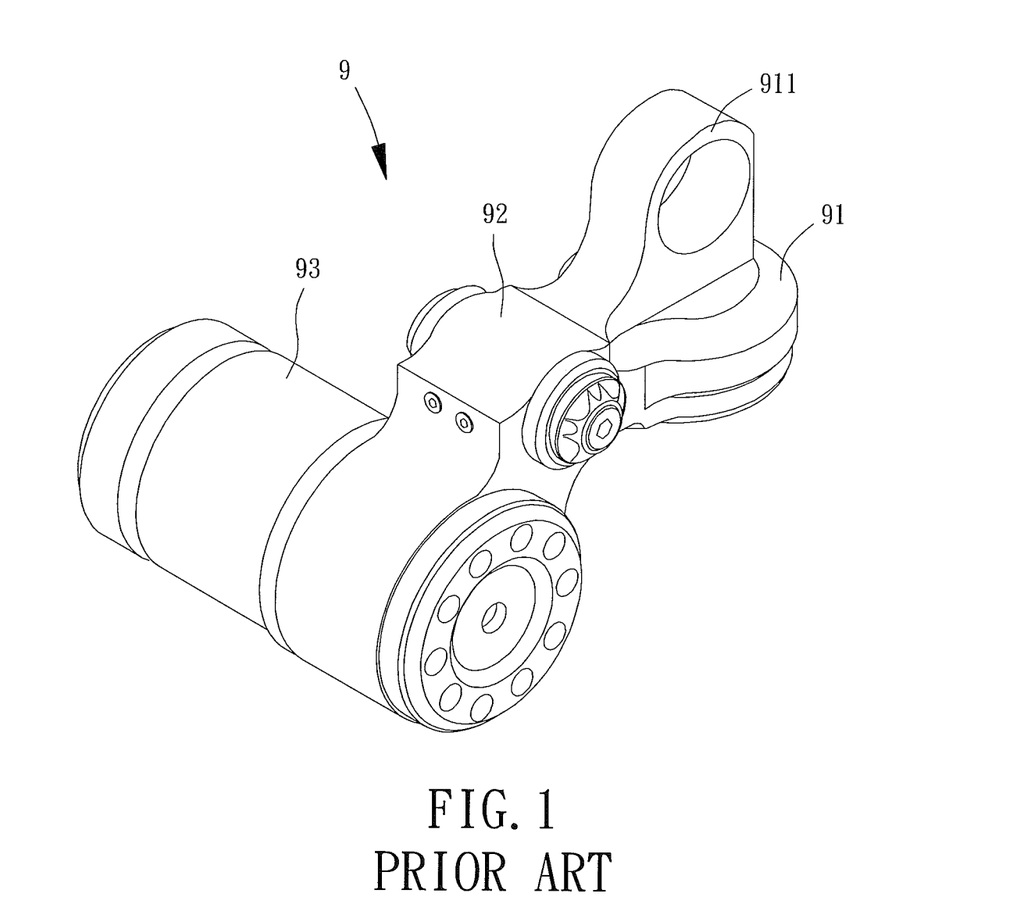
FIG. 1 is a perspective view of a conventional shock absorber.

FIG. 1 shows a conventional shock absorber 9 including a fixing portion 91, a connection seat 92, and a gas tank 93. The fixing portion 91 is connected to the connection seat 92, and the gas tank 93 is fixed to the connection seat 92. The conventional shock absorber 9 includes a longitudinal axis. The fixing portion 91 includes a fixing ring 911 on a side of the fixing portion 91 along the longitudinal axis and can be used to fix the conventional shock absorber 9 to a vehicular body. A damper can be mounted to the other side of the fixing portion 91 along the longitudinal axis, such that the conventional shock absorber 9 provides a buffering effect for the vehicle. A high pressure gas is filled in the gas tank 93 to adjust the compressing speed of the damper, providing an appropriate buffering effect. An example of such a conventional shock absorber 9 is disclosed in Taiwan Utility Model M341643 entitled "IMPROVED GAS TANK STRUCTURE FOR MOTORCYCLE SHOCK ABSORBING DEVICE".

Responsive to the mounting position of the conventional shock absorber in different locations of the vehicular body, the gas tank 93 can be parallel, perpendicular, or at a specific angle to the longitudinal axis. As an example of a centered shock absorber mounted to a center of a motorcycle frame, the gas tank 93 is designed to be perpendicular to the longitudinal axis to fit the spatial arrangement in the motorcycle frame.

However, various manufacturers have different designs of vehicular bodies. To match the different designs of vehicular bodies, the conventional shock absorber 9 permits a user to attach the gas tank 93 to the left or right side of the connection seat 92 for the purposes of avoiding interfering with the vehicular bodies or components in the vehicular bodies. However, in a case that the longitudinal axis of the fixing portion 91 is perpendicular to the ground (namely, the damper coupled to the fixing portion 91 is perpendicular to the ground), if the gas tank 93 is mounted to be perpendicular to the longitudinal axis, the gas tank 93 is at the same level no matter whether the gas tank 93 is mounted to the left or right side of the connection seat 92. In other words, if a vehicular body to which the conventional shock absorber 9 is to be mounted includes components located on the level, the gas tank 93 cannot avoid the components no matter which side of the connection seat 92 the gas tank 93 is mounted to. Thus, the conventional shock absorber 9 can only be applied on limited types of vehicles, leading to a small application range.

In view of this disadvantage of small application range, manufacturers must design connection seats 92 of different specifications in response to various types of vehicles to avoid the gas tank 93 coupled to the connection seat 92 contacting with components in the vehicular body, which significantly increases the manufacturing costs of the shock absorber 9. Thus, a need exists for an improved vehicular shock absorber to increase the market value of the vehicular shock absorber 9.

SUMMARY OF THE INVENTION

An objective of the present invention is to provide an adjusting device for a damp adjustment cylinder and a vehicular shock absorber including the adjusting device, providing a position adjusting function for the damp adjustment cylinder to increase the application range of the vehicular shock absorber.

The present invention fulfills the above objective by providing an adjusting device for a damp adjustment cylinder. The adjusting device includes a connecting member having a chamber. The connecting member further includes first and second openings respectively in two ends thereof. The first and second openings communicate with the chamber. The connecting member further includes a first assembling portion in the chamber. The connecting member further includes a first threaded portion in the second opening. The connecting member further includes an inner periphery, an outer periphery, and a through-hole extending from the inner periphery through the outer periphery and communicated with the chamber. An adjusting member includes a pivotal end having a second assembling portion. The first assembling portion and the second assembling portion are assembled with each other. The adjusting member further includes a passage having first and second openings respectively in two ends thereof. The first opening of the adjusting member is located in the pivotal end. A sealing cap is in threading connection with the first threaded portion of the connecting member.

The pivotal end of the adjusting member can have a maximum outer diameter smaller than a diameter of the first opening of the connecting member. The pivotal end of the adjusting member can extend into the chamber via the first opening of the connecting member to permit assembly of the first and second assembling portions. The sealing cap can extend into the chamber via the second opening of the connecting member to be in threading connection with the first threaded portion.

In an example, the first assembling portion of the connecting member includes an axial hole located in a central portion of the first assembling portion and a plurality of positioning holes disposed in a circumferential direction. The second assembling portion of the adjusting member includes an axial coupling portion and a positioning portion. The axial hole of the first assembling portion engages with the axial coupling portion of the second assembling portion. The positioning portion of the second assembling portion is aligned and engages with one of the plurality of positioning holes of the first assembling portion.

In another example, the first assembling portion of the connecting member includes a plurality of positioning holes disposed in a circumferential direction. The second assembling portion of the adjusting member includes a plurality of positioning portions disposed in a circumferential direction. The number of the plurality of positioning portions is smaller than the number of the plurality of positioning holes. The plurality of positioning portions of the second assembling portion is aligned and engages with some of the plurality of positioning holes of the first assembling portion.

In a further example, the connecting member further includes a second threaded portion in the first opening. The maximum outer diameter of the pivotal end of the adjusting member is smaller than a diameter of the second opening of the connecting member. The pivotal end of the adjusting member can extend into the chamber via the second opening of the connecting member to permit assembly of the first and second assembling portions. The sealing cap can extend into the chamber via the first opening to be in threading connection with the second threaded portion.

In another aspect, a vehicular shock absorber includes the adjusting device, a damper coupled to a first engagement portion of the connecting member, and a damp adjustment cylinder coupled to a second engagement portion of the adjusting member.

The damper extends in a first direction, and the damp adjustment cylinder extends in a second direction not parallel to the first direction. In an example, the second direction is perpendicular to the first direction.

The connecting member can be disposed in the second direction. The first opening and the second opening are respectively located in two ends of the connecting member and are spaced from each other in the second direction.

In an example, the damper includes a third engagement portion and a groove. The third engagement portion is coupled to the first engagement portion of the connecting member. The groove of the damper communicates with the through-hole of the connecting member. The damper communicates with the chamber of the connecting member via the groove and the through-hole. The damp adjustment cylinder includes a fourth engagement portion and a channel. The fourth engagement portion is coupled to the second engagement portion of the adjusting member. The channel communicates with the second opening of the passage of the adjusting member. The damp adjustment cylinder communicates with the chamber via the channel and the passage.

In the adjusting device for a damp adjustment cylinder and the vehicular shock absorber including the adjusting device according to the present invention, the position of the damp adjustment cylinder can be adjusted by pivoting the adjusting member relative to the connecting member to increase the application range of the vehicular shock absorber.

The present invention will become clearer in light of the following detailed description of illustrative embodiments of this invention described in connection with the drawings.

DETAILED DESCRIPTION OF THE INVENTION

Figure 2:
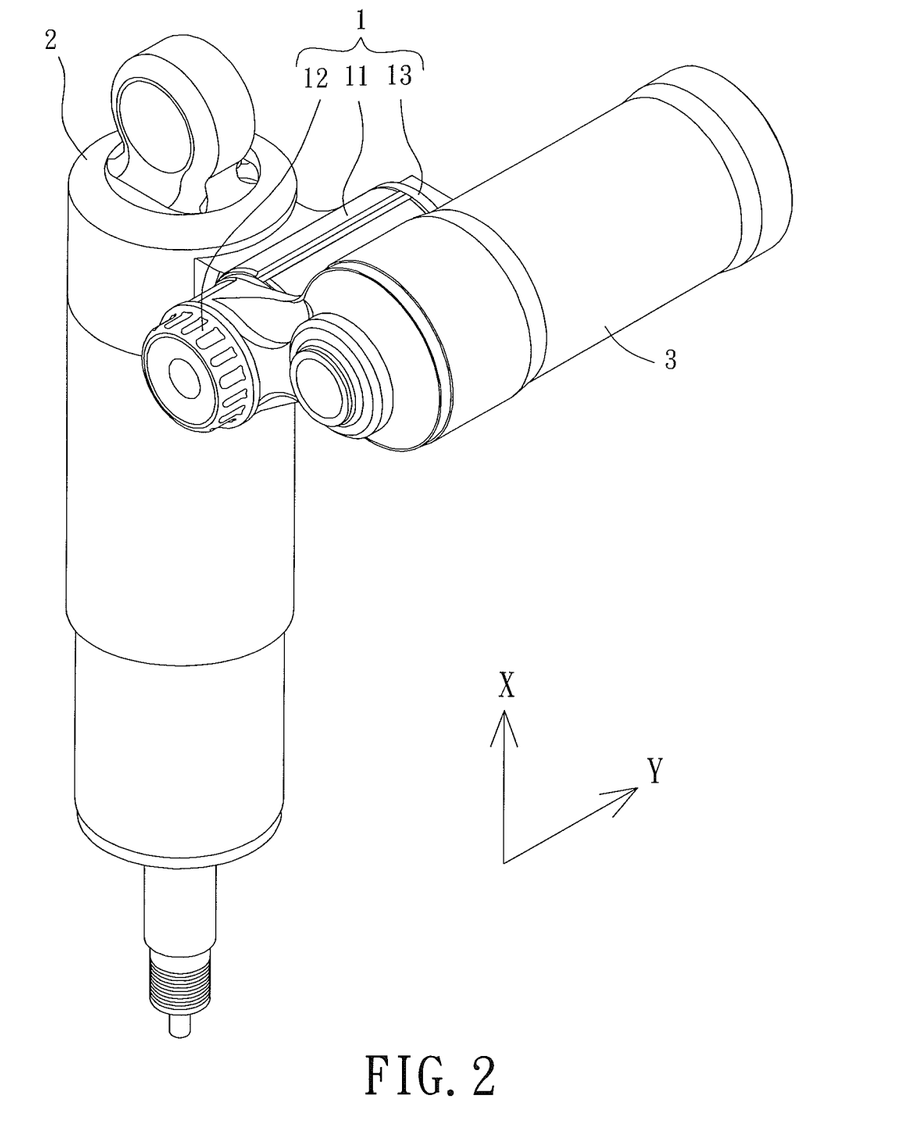
FIG. 2 is a perspective view of a vehicular shock absorber of a first embodiment according to the present invention.
Figure 3:
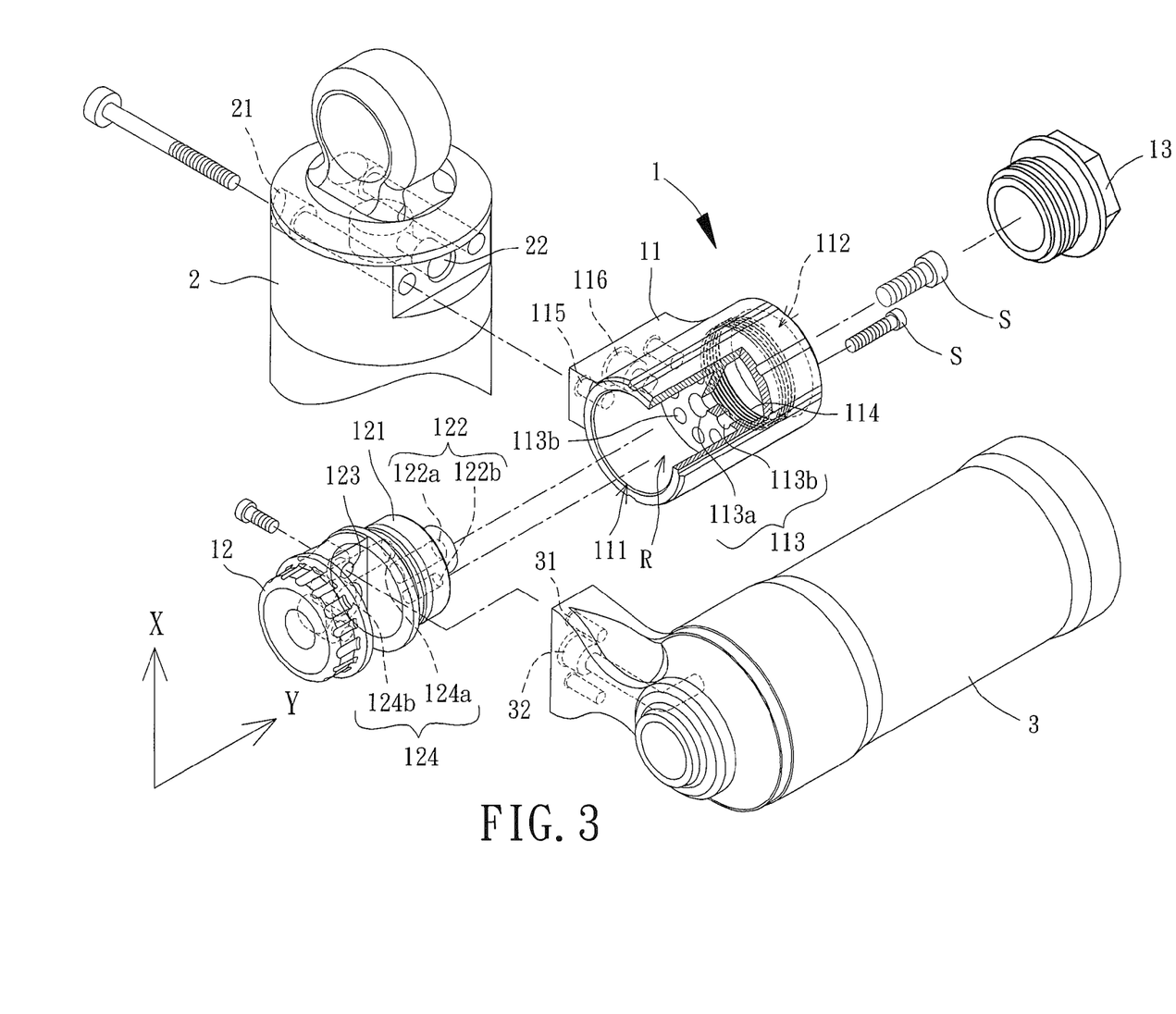
FIG. 3 is an exploded, perspective view of the vehicular shock absorber of FIG. 2.

With reference to FIGS. 2 and 3, an adjusting device 1 for a damp adjustment cylinder according to the present invention includes a connecting member 11, an adjusting member 12, and a sealing cap 13. The adjusting member 12 and the sealing cap 13 are coupled to two ends of the connecting member 11. The connecting member 11 can be coupled with a damper 2. The adjusting member 12 can be coupled with a damp adjustment cylinder 3.

The connecting member 11 includes a chamber R. The connecting member 11 further includes first and second openings 111 and 112 respectively in the two ends thereof. The first and second openings 111 and 112 communicate with the chamber R. The connecting member 11 further includes a first assembling portion 113 in the chamber R. The adjusting member 12 can extend through the first opening 111 into the chamber R for coupling with the first assembling portion 113. The connecting member 11 further includes a threaded portion 114 in the second opening 112. The sealing cap 13 can extend through the second opening 112 into the chamber R for threading connection with the threaded portion 114. Furthermore, the connecting member 11 further includes a first engagement portion 115 on an outer periphery thereof. The first engagement portion 115 can couple with the damper 2. Furthermore, the connecting member 11 includes a through-hole 116 extending from an inner periphery thereof through the outer periphery thereof and communicated with the chamber R.

The adjusting member 12 includes a pivotal end 121 having a maximum outer diameter smaller than a diameter of the first opening 111 of the connecting member 11, such that the pivotal end 121 can extend into the chamber R via the first opening 111. The pivotal end 121 of the adjusting member 12 has a second assembling portion 122. When the pivotal end 121 extends through the first opening 111 into the chamber R, the second assembling portion 122 can be aligned with the first assembling portion 113, such that the first assembling portion 113 and the second assembling portion 122 can be assembled with each other. The adjusting member 12 further includes a second engagement portion 123 for coupling with the damp adjustment cylinder 3. Furthermore, the adjusting member 12 includes a passage 124 having first and second openings 124a and 124b in two ends thereof. The first opening 124a is located in the pivotal end 121.

Note that the maximum outer diameter of the pivotal end 121 of the adjusting member 12 is smaller than the diameter of the first opening 111 of the connecting member 11, the pivotal end 121 can be pivoted relative to the connecting member 11 before assembly of the first assembling portion 113 and the second assembling portion 122. Namely, the adjusting member 12 can be pivoted relative to the connecting member 11. After the adjusting member 12 has been pivoted to a desired location, the first assembling portion 113 and the second assembling portion 122 can be assembled with each other to fix the relative position between the adjusting member 12 and the connecting member 11. More specifically, in this embodiment, the first assembling portion 113 of the connecting member 11 includes an axial hole 113a located in a central portion of the first assembling portion 113 and a plurality of positioning holes 113b disposed in a circumferential direction. The second assembling portion 122 of the adjusting member 12 includes an axial coupling portion 122a and a positioning portion 122b. When the pivotal end 121 extends through the first opening 111 into the chamber R, the axial hole 113a of the first assembling portion 113 is aligned and engages with the axial coupling portion 122a of the second assembling portion 122, and the positioning portion 122b of the second assembling portion 122 is aligned and engages with one of the positioning holes 113b of the first assembling portion 113, such that the first assembling portion 113 and the second assembling portion 122 can be assembled with each other. Since the positioning holes 113b are disposed in the first assembling portion 113 in the circumferential direction, when the second assembling portion 122 is pivoted relative to the connecting member 11, the positioning portion 122b of the second assembling portion 122 can be aligned and engage with another positioning hole 113b of the first assembling portion 113. By such an arrangement, the adjusting member 12 can be pivoted to a desired location, and the positioning portion 122b can engage with one of the positioning holes 113b aligned with the positioning portion 122b, fixing the relative position between the adjusting member 12 and the connecting member 11.

In this embodiment, the axial coupling portion 122a of the adjusting member 12 is a fixing hole, such that a fastener S (such as a screw or a bolt) can extend through the axial hole 113a of the first assembling portion 113 and can be fixed in the axial coupling portion 122a in the form of a fixing hole. Likewise, the positioning portion 122b of the second assembling portion 122 can also be a fixing hole, such that another fastener S can extend through one of the positioning holes 113b of the first assembling portion 113 and can be fixed in the positioning portion 122b in the form of a fixing hole. By such an arrangement, when the axial coupling portion 122a and the positioning portion 122b of the second assembling portion 122 are fixed by the fasteners S to the first assembling portion 113, the adjusting member 12 cannot pivot relative to the connecting member 11 to fix the relative position between the adjusting member 12 and the connecting member 11.

Nevertheless, the axial coupling portion 122a of the second assembling portion 122 can be in the form of a pivot, such that the axial coupling portion 122a is pivotably engaged in the axial hole 113a of the first assembling portion 113. When the positioning portion 122b of the second assembling portion 122 is aligned and engages with one of the positioning holes 113b of the first assembling portion 113, the axial coupling portion 122a cannot pivot relative to the axial hole 113a. Similarly, the positioning portion 122b of the second assembling portion 122 can be in the form of a screw rod. The screw rod can extend through one of the positioning holes 113b of the first assembling portion 113, and a nut can be engaged with the positioning portion 122b (the screw rod) to fix the positioning portion 122b in the positioning hole 113b. The assembly between the first assembling portion 113 and the second assembling portion 122 is not limited to the above examples in the present invention. Furthermore, the axial coupling portion 122a of the second assembling portion 122 can be assembled with the axial hole 113a of the first assembling portion 113 to form a pivotable or non-pivotable connection.

The sealing cap 13 can extend through the second opening 112 of the connecting member 11 into the chamber R for threading connection with the threaded portion 114. Thus, the sealing cap 13 is coupled to the connecting member 11. Furthermore, the sealing cap 13 can seal the second opening 112 of the connecting member 11 to provide an airtight effect. The sealing cap 13 can further include a sealing member, such as an O-ring, to enhance the sealing effect of the connecting member 11 provided by the sealing cap 13. However, the present invention is not limited to this.

In use of the adjusting device 1 for a damp adjustment cylinder of the first embodiment according to the present invention, the adjusting device 1 can be coupled with a damper 2 and a damp adjustment cylinder 3, such that the adjusting device 1, the damper 2, and the damp adjustment cylinder 3 together form a vehicular shock absorber. The damper 2 extends in a first direction X. The damp adjustment cylinder 3 extends in a second direction Y not parallel to the first direction X. In this embodiment, the second direction Y is perpendicular to the first direction X.

Figure 4:
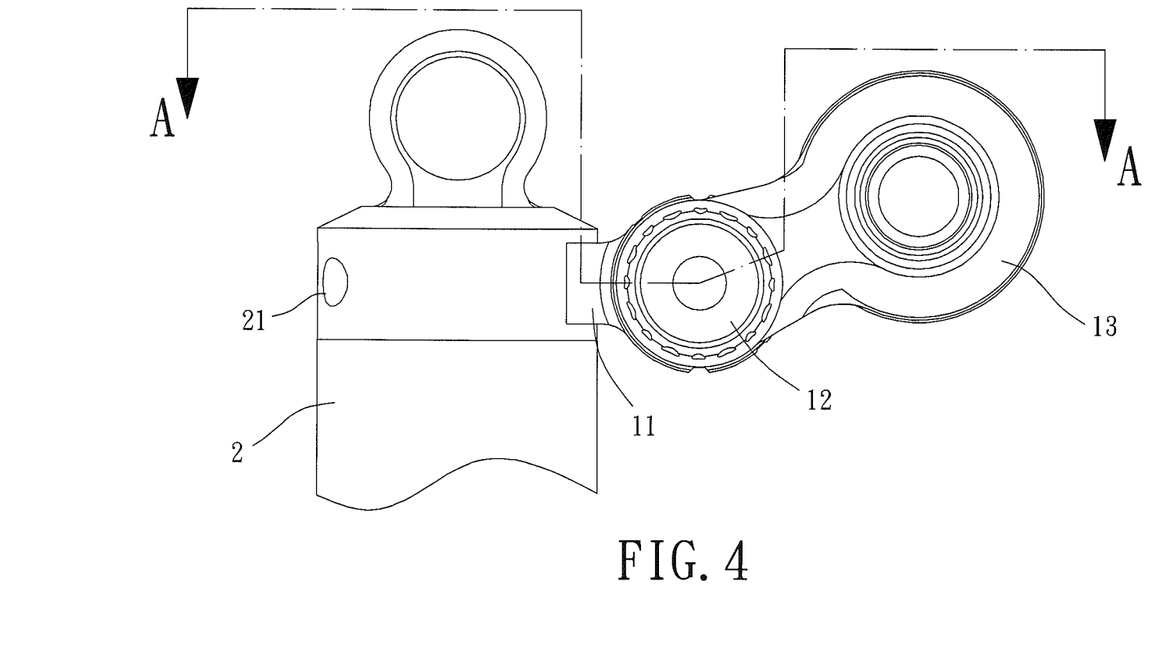
FIG. 4 is a side view of the vehicular shock absorber of FIG. 2 in a second direction.
Figure 5:
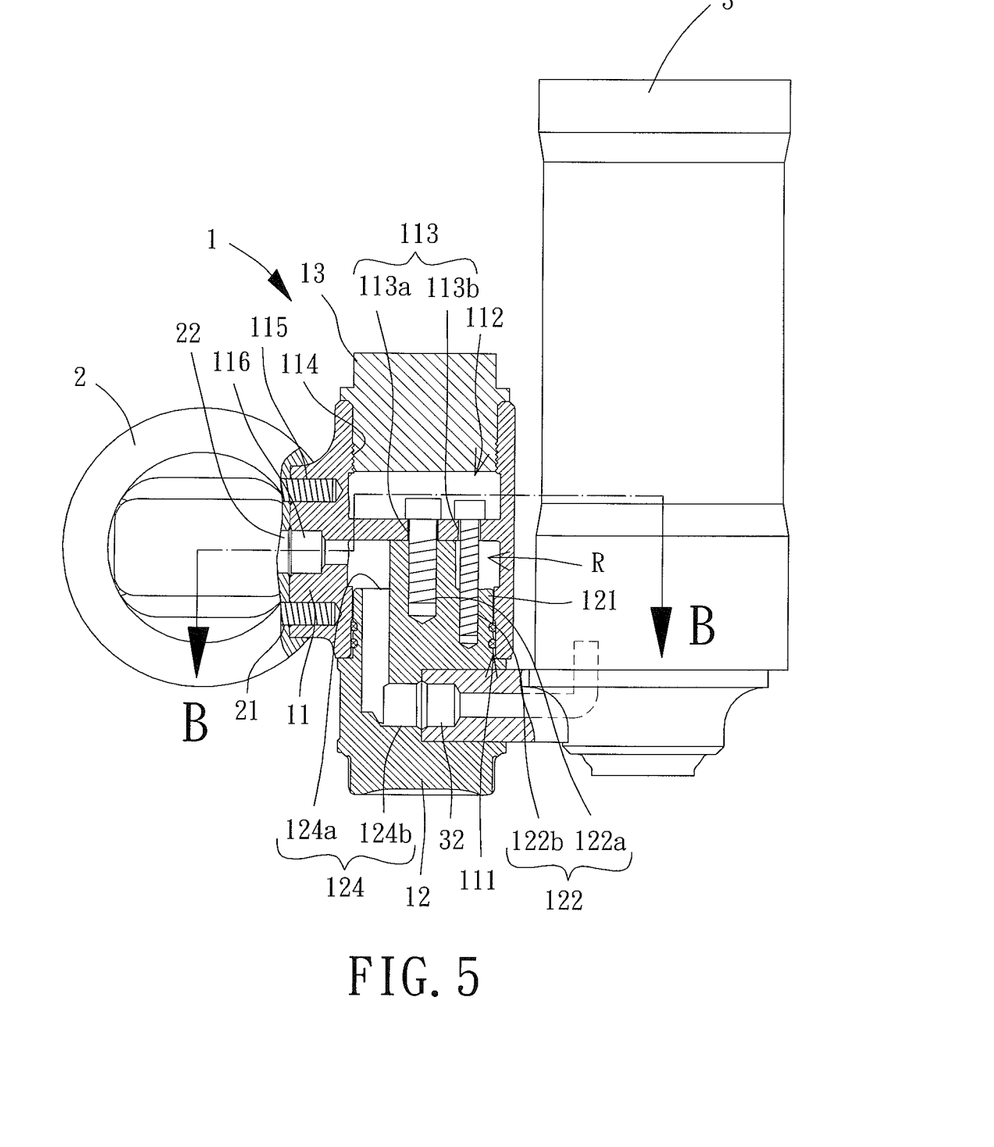
FIG. 5 is a cross sectional view of the vehicular shock absorber taken along section line A-A of FIG. 4.

FIGS. 4 and 5 respectively show a side view of the shock absorber in the second direction Y and a cross sectional view taken along section line A-A of FIG. 4. The damper 2 can be a damping device using a hydraulic or pneumatic approach to provide a buffering effect. Furthermore, springs (not shown) can be mounted around the damper 2 and attached to two ends of the damper 2 to enhance the shock absorbing function of the damper 2. The damper 2 is coupled to the connecting member 11. Specifically, the damper 2 includes a third engagement portion 21 and a groove 22. The third engagement portion 21 is coupled to the first engagement portion 115 of the connecting member 11 to thereby couple the damper 2 to the connecting member 11. The third engagement portion 21 and the first engagement portion 115 can be coupled by any suitable provision, including but not limited to screwing, male/female coupling, and threading connection. The groove 22 is in communication with an interior of the damper 2. The groove 22 communicates with the through-hole 116 of the connecting member 11 when the damper 2 is coupled to the connecting member 11. Namely, the damper 2 communicates with the chamber R of the connecting member 11 via the groove 22 and the through-hole 116.

The damp adjustment cylinder 3 can be a gas tank including an interior space receiving a high pressure fluid, such as nitrogen. The damp adjustment cylinder 3 is coupled to the adjusting member 12. Specifically, the damp adjustment cylinder 3 includes a fourth engagement portion 31 and a channel 32. The fourth engagement portion 31 is coupled to the second engagement portion 123 of the adjusting member 12 to thereby couple the damp adjustment cylinder 3 to the adjusting member 12. The fourth engagement portion 31 and the second engagement portion 123 can be coupled by any suitable provision, including but not limited to screwing, male/female coupling, and threading connection. The channel 32 communicates with an interior of the damp adjustment cylinder 3. The channel 32 communicates with the second opening 124b of the passage 124 of the adjusting member 12 when the damper 2 is coupled to the adjusting member 12. Since the first opening 124a of the passage 124 is disposed in the pivotal end 121 of the adjusting member 12, the damp adjustment cylinder 3 communicates with the chamber R of the connecting member 11 via the channel 32 and the passage 124.

By the above structure, in the vehicular shock absorber comprised of the adjusting device 1 for a damp adjustment cylinder of the first embodiment according to the present invention, the damper 2, and the damp adjustment cylinder 3, and since the damper 2 and the damp adjustment cylinder 3 communicate with the chamber R of the connecting member 11, the high pressure fluid in the damp adjustment cylinder 3 provides the interior of the damper 2 with a pressure to buffer the compressing speed of the damper 2, thereby adjusting the buffering effect of the damper 2.

Figure 6:
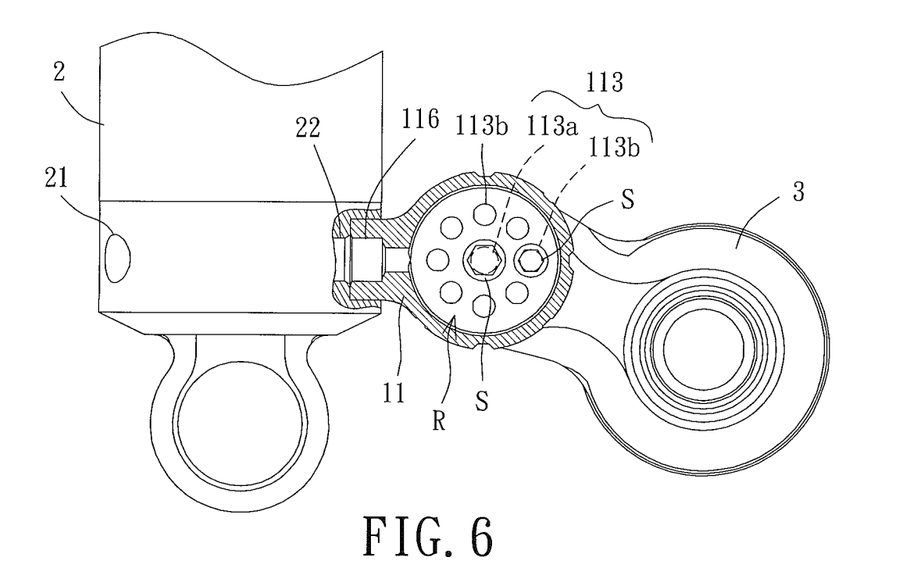
FIG. 6 is a cross sectional view of the vehicular shock absorber taken along section line B-B of FIG. 5.
Figure 7:
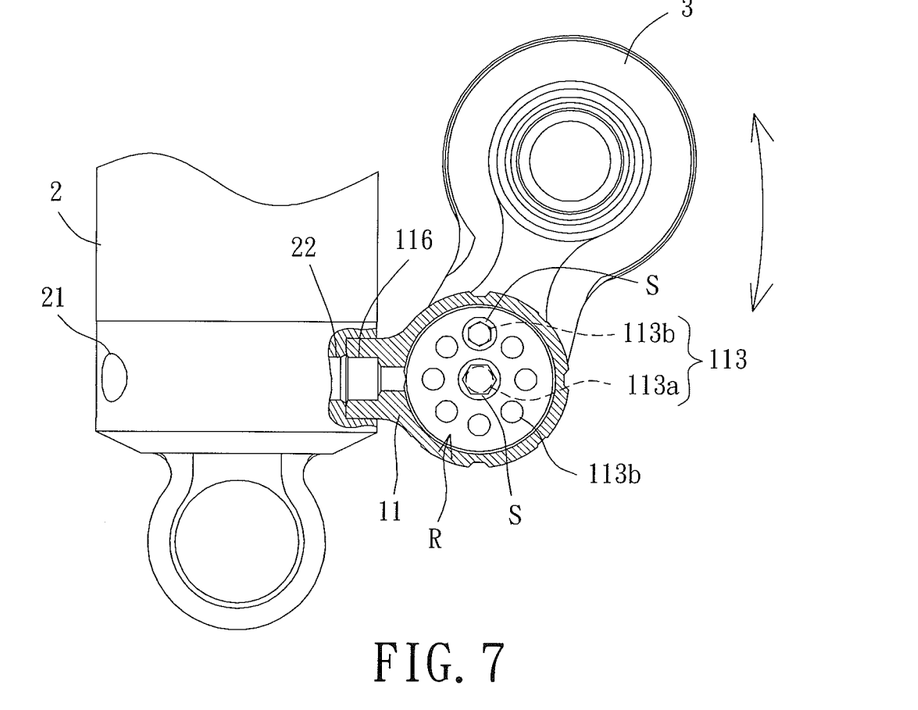
FIG. 7 is a view similar to FIG. 6, with an adjusting member pivoted.

The main features of the adjusting device 1 for a damp adjustment cylinder of the first embodiment according to the present invention are that the adjusting member 12 can be pivoted relative to the connecting member 11, and the first assembling portion 113 and the second assembling portion 122 are assembled with each other to fix the relative position between the adjusting member 12 and the connecting member 11. For example, please refer to FIG. 6 which is a cross sectional view taken along section line B-B of FIG. 5. When the vehicular shock absorber is mounted to a vehicular body, the adjusting member 12 is pivoted to a desired position, such that the damp adjustment cylinder 3 coupled to the adjusting member 12 will not contact with components in the vehicular body. Furthermore, the position of the damp adjustment cylinder 3 is fixed by fixing the axial coupling portion 122a of the second assembling portion 122 in the axial hole 113a of the first assembling portion 113 and by fixing the positioning portion 122b of the second assembling portion 122 in one of the positioning holes 113b of the first assembling portion 113. In a case that the vehicular shock absorber is to be mounted to another vehicular body of a different type, the damp adjustment cylinder 3 could interfere with components in the other vehicular body due to a different structural disposition. In this case, as shown in FIG. 7, the positioning portion 122b of the second assembling portion 122 is removed from the one of the positioning holes 113h of the first assembling portion 113, and the adjusting member 12 is pivoted to another position, such that the damp adjustment cylinder 3 will not contact with components in the other vehicular body. Then, the positioning portion 122b is fixed in another positioning hole 113b of the first assembling portion 113 to fix the damp adjustment cylinder 3.

Thus, in the adjusting device 1 for a damp adjustment cylinder of the first embodiment according to the present invention and the vehicular shock absorber including the adjusting device 1, the damper 2 and the damp adjustment cylinder 3 are coupled to the adjusting device 1, and the adjusting member 12 can be pivoted relative to the connecting member 11, such that the position of the damp adjustment cylinder 3 can be adjusted in response to different vehicular bodies, increasing the application range of the vehicular shock absorber.

Note that the damp adjustment cylinder 3 is disposed in the second direction Y, and the connecting member 11 is preferably also disposed in the second direction Y, such that the first opening 111 and the second opening 112 are respectively located in two ends of the connecting member 11 and are spaced from each other in the second direction Y. Thus, the pivotal end 121 of the adjusting member 12 can pivot about the second direction Y, such that the damp adjustment cylinder 3 coupled to the adjusting member 12 pivots about the second direction Y when the adjusting member 12 is pivoted relative to connecting member 11. In an example in which the first direction X is perpendicular to the ground (namely, the damper 2 is perpendicular to the ground), the second direction Y is perpendicular to the first direction X when the damp adjustment cylinder 3 is disposed perpendicularly to the first direction X. Thus, when a user pivots the adjusting member 12 relative to the connecting member 11 to pivot the damp adjustment cylinder 3 about the second direction Y, the level of the damp adjustment cylinder 3 continuously changes during the pivotal movement. In comparison with the conventional shock absorber 9 in which the gas tank 93 is at the same level no matter which side of the connection seat 92 the gas tank 93 is mounted to, the adjusting device 1 for a damp adjustment cylinder of the first embodiment according to the present invention can permit adjustment of the relative position between the damp adjustment cylinder 3 and the damper 2, such that the vehicular shock absorber according to the present invention can be used in different vehicular bodies.

Figure 8:
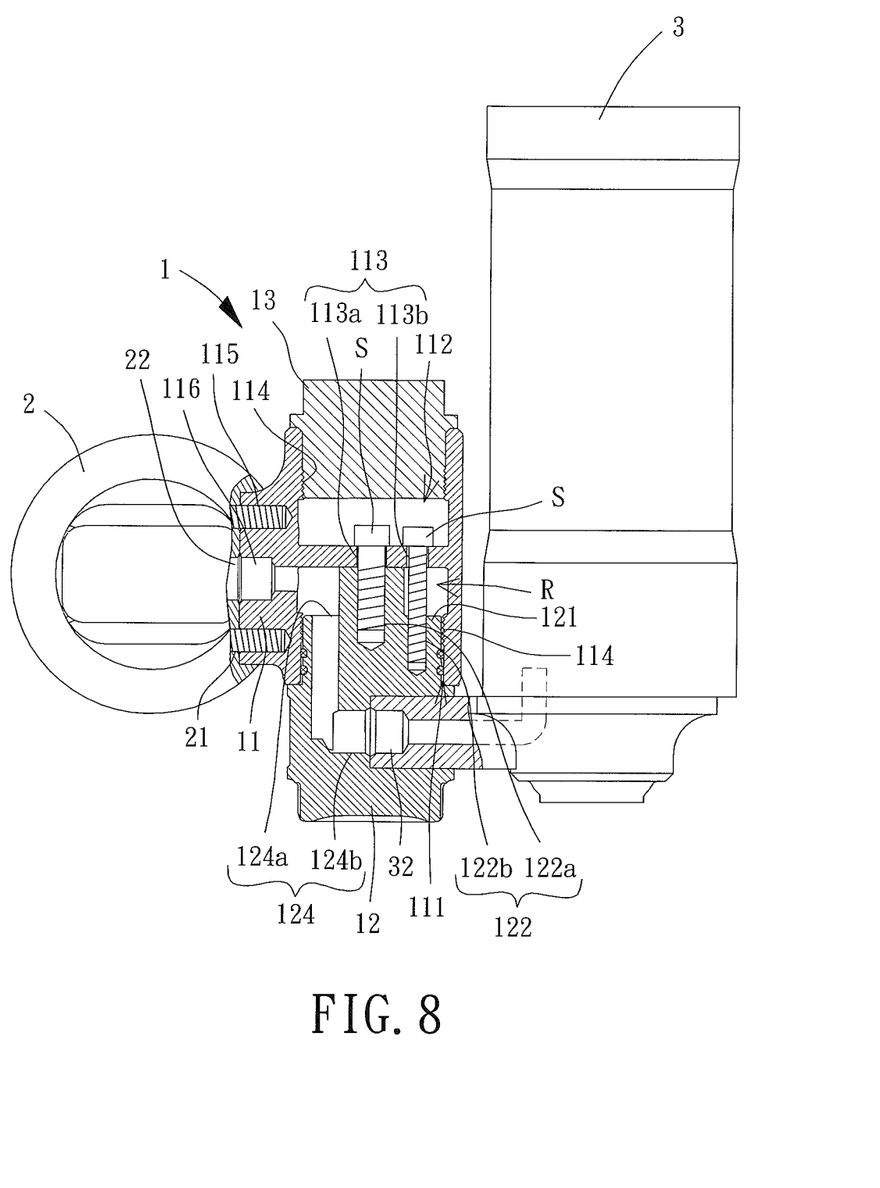
FIG. 8 is a partially cross-sectioned side view of a vehicular shock absorber of a second embodiment according to the present invention, with an adjusting member of the vehicular shock absorber mounted to an end of a connecting member.
Figure 9:
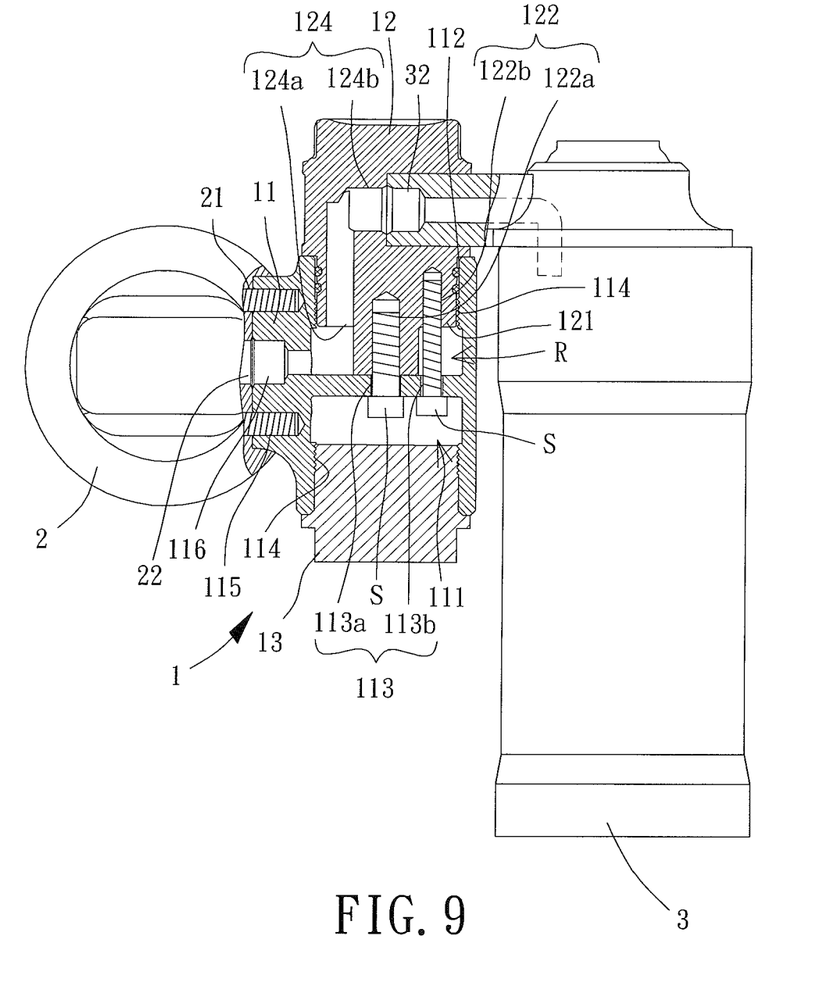
FIG. 9 is a partially cross-sectioned side view of the vehicular shock absorber of the second embodiment according to the present invention, with the adjusting member of the vehicular shock absorber mounted to the other end of the connecting member.

FIGS. 8 and 9 show an adjusting device 1 for a damp adjustment cylinder of a second embodiment according to the present invention. The second embodiment is different from the first embodiment by that the connecting member 11 further includes a threaded portion 114 in the first opening 111. Namely, a threaded portion 114 is provided in each of the first and second openings 111 and 112 of the connecting member 11. Furthermore, the maximum outer diameter of the pivotal end 121 of the adjusting member 12 is smaller than a diameter of the second opening 112 of the connecting member 11. Thus, the sealing cap 13 can extend through the first opening 111 into the chamber R for threading connection with the threaded portion 114 in the first opening 111 or extend through the second opening 112 into the chamber R for threading connection with the threaded portion 114 in the second opening 112. Thus, the first assembling portion 113 and the second assembling portion 122 can be assembled with each other. As a result, the adjusting device 1 for a damp adjustment cylinder of the second embodiment according to the present invention permits the adjusting member 12 to couple with an end of the connecting member 11 having the first opening 111 or the other end of the connecting member 11 having the second opening 112, allowing the damp adjustment cylinder 3 coupled to the connecting member 11 to be located in either side of the connecting member 11 in the second direction Y.

In the adjusting device 1 for a damp adjustment cylinder of the second embodiment according to the present invention and the vehicular shock absorber including the adjusting device 1, the damp adjustment cylinder 3 can be selectively disposed on either side of the connecting member 11 in the second direction Y, and the adjusting member 12 can be pivoted relative to the connecting member 11, providing a position adjusting function for the damp adjustment cylinder 3. Thus, the damp adjustment cylinder 3 is more flexible in adjustment, further increasing the application range of the vehicular shock absorber.

Figure 10:
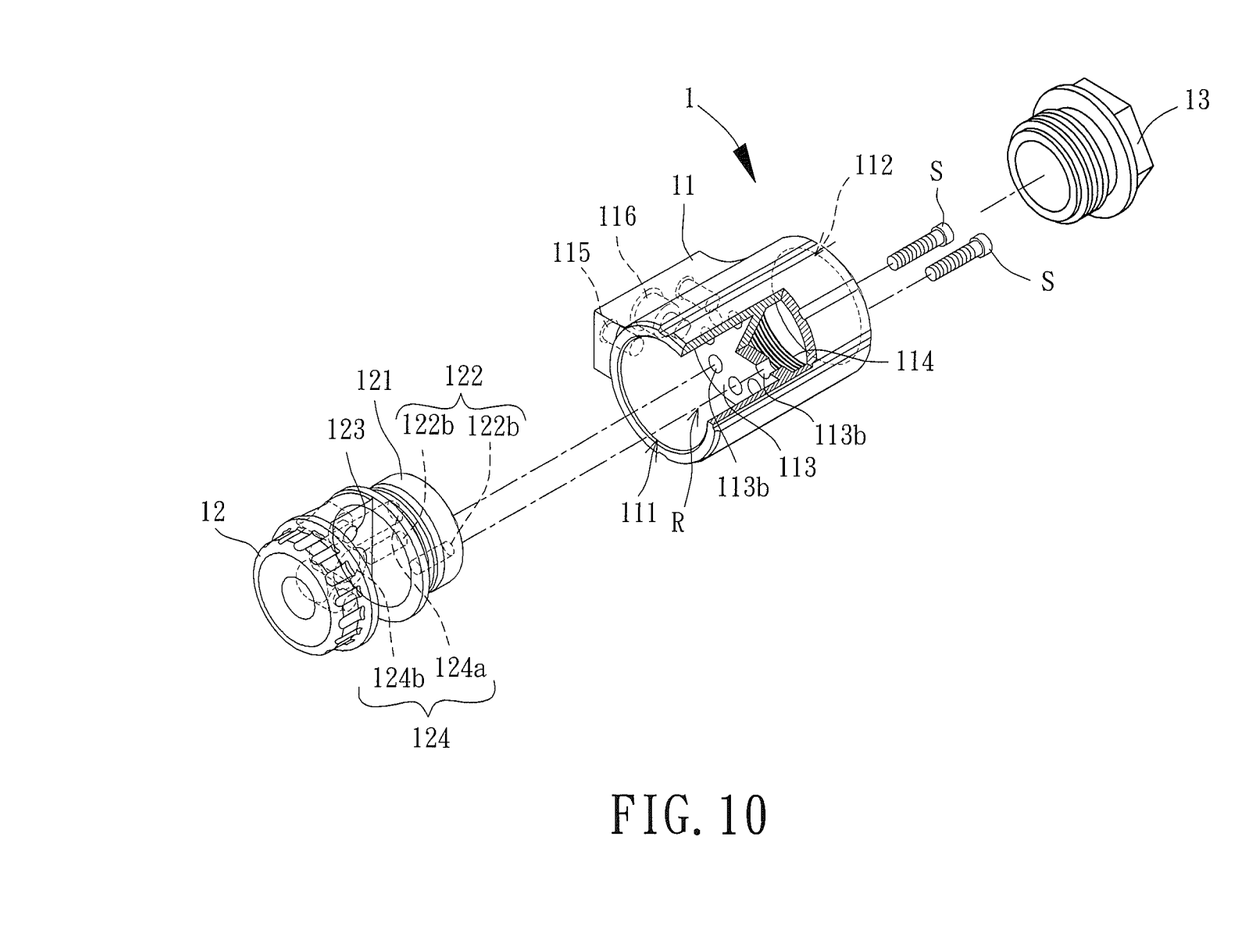
FIG. 10 is an exploded, perspective view of a vehicular shock absorber of a third embodiment according to the present invention.

FIG. 10 shows an adjusting device 1 for a damp adjustment cylinder of a third embodiment according to the present invention. The third embodiment is different from the first embodiment since the first assembling portion 113 of the connecting member 11 does not include the axial hole 113a, and the second assembling portion 122 of the adjusting member 12 does not include the axial coupling portion 122a. Furthermore, the second assembling portion 122 of the adjusting member 12 includes a plurality of positioning portions 122b disposed in a circumferential direction. The number of the positioning portions 122b is smaller than the number of the positioning holes 113b.

Since the positioning holes 113b are disposed in the first assembling portion 113 in a circumferential direction, since the positioning portions 122b are disposed on the second assembling portion 122 in a circumferential direction, and when the adjusting member 12 is pivoted relative to the connecting member 11, the positioning portions 122b of the second assembling portion 122 are aligned and engage with some of the positioning holes 113b of the first assembling portion 113. As an example, if the second assembling portion 122 includes two positioning portions 122b, and when the adjusting member 12 is pivoted to a desired location, the two positioning portions 122b are aligned and engage with two of the positioning holes 113b of the first assembling portion 113. Thus, when the positioning portions 122b of the second assembling portion 122 engage with some of the positioning holes 113b of the first assembling portion 113, pivotal movement of the adjusting member 12 relative to the connecting member 11 is prevented to fix the relative position between the adjusting member 12 and the connecting member 11. Thus, the adjusting device 1 for a damp adjustment cylinder of the third embodiment according to the present invention can achieve the same positioning effect for the adjusting member 12 and the connecting member 11 by replacing the axial hole 113a of the first assembling portion 113 and the axial coupling portion 122a of the second assembling portion 122 in the first embodiment with the second assembling portion 122 including the positioning portions 122b.

In view of the foregoing, in the various embodiments of the adjusting device 1 for a damp adjustment cylinder and the vehicular shock absorbers including the adjusting device 1, the position of the damp adjustment cylinder 3 can be adjusted by pivoting the adjusting member 12 relative to the connecting member 11 to increase the application range of the vehicular shock absorber.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An adjusting device for a damp adjustment cylinder, comprising:
   a connecting member including a chamber, with the connecting member further including first and second openings respectively in two ends thereof, with the first and second openings communicated with the chamber, with the connecting member further including a first assembling portion in the chamber, with the first assembling portion of the connecting member including an axial hole located in a central portion of the first assembling portion and a plurality of positioning holes disposed in a circumferential direction, with the connecting member further including a first threaded portion in the second opening, with the connecting member further including an inner periphery, an outer periphery, and a through-hole extending from the inner periphery through the outer periphery and communicated with the chamber;
   an adjusting member including a pivotal end having a second assembling portion, with the first assembling portion and the second assembling portion assembled with each other, with the second assembling portion of the adjusting member including an axial coupling portion and a positioning portion, with the axial hole of the first assembling portion engaged with the axial coupling portion of the second assembling portion, with the positioning portion of the second assembling portion aligned and engaged with one of the plurality of positioning holes of the first assembling portion, with the adjusting member further including a passage, with the passage including first and second openings respectively in two ends thereof, with the first opening of the adjusting member located in the pivotal end; and
   a sealing cap in threading connection with the first threaded portion of the connecting member.

2. The adjusting device for a damp adjustment cylinder as claimed in claim 1, with the pivotal end of the adjusting member having a maximum outer diameter smaller than a diameter of the first opening of the connecting member, with the pivotal end of the adjusting member extending into the chamber via the first opening of the connecting member to permit assembly of the first and second assembling portions, and with the sealing cap extending into the chamber via the second opening of the connecting member to be in threading connection with the first threaded portion.

3. The adjusting device for a damp adjustment cylinder as claimed in claim 2, with the connecting member further including a second threaded portion in the first opening, with the maximum outer diameter of the pivotal end of the adjusting member smaller than a diameter of the second opening of the connecting member, with the pivotal end of the adjusting member extending into the chamber via the second opening of the connecting member to permit assembly of the first and second assembling portions, and with the sealing cap extending into the chamber via the first opening to be in threading connection with the second threaded portion.

4. The adjusting device for a damp adjustment cylinder, comprising:
   a connecting member including a chamber, with the connecting member further including first and second openings respectively in two ends thereof, with the first and second openings communicated with the chamber, with the connecting member further including a first assembling portion in the chamber, with the first assembling portion of the connecting member including a plurality of positioning holes disposed in a circumferential direction, with the connecting member further including a first threaded portion in the second opening, with the connecting member further including an inner periphery, an outer periphery, and a through-hole extending from the inner periphery through the outer periphery and communicated with the chamber;
   an adjusting member including a pivotal end having a second assembling portion, with the first assembling portion and the second assembling portion assembled with each other, with the second assembling portion of the adjusting member including a plurality of positioning portions disposed in a circumferential direction, with a number of the plurality of positioning portions smaller than a number of the plurality of positioning holes, with the plurality of positioning portions of the second assembling portion aligned and engaged with some of the plurality of positioning holes of the first assembling portion, with the adjusting member further including a passage, with the passage including first and second openings respectively in two ends thereof, with the first opening of the adjusting member located in the pivotal end; and
   a sealing cap in threading connection with the first threaded portion of the connecting member.

5. The adjusting device for a damp adjustment cylinder as claimed in claim 4, with the pivotal end of the adjusting member having a maximum outer diameter smaller than a diameter of the first opening of the connecting member, with the pivotal end of the adjusting member extending into the chamber via the first opening of the connecting member to permit assembly of the first and second assembling portions, and with the sealing cap extending into the chamber via the second opening of the connecting member to be in threading connection with the first threaded portion.

6. The adjusting device for a damp adjustment cylinder as claimed in claim 5, with the connecting member further including a second threaded portion in the first opening, with the maximum outer diameter of the pivotal end of the adjusting member smaller than a diameter of the second opening of the connecting member, with the pivotal end of the adjusting member extending into the chamber via the second opening of the connecting member to permit assembly of the first and second assembling portions, and with the sealing cap extending into the chamber via the first opening to be in threading connection with the second threaded portion.

7. A vehicular shock absorber comprising:
a connecting member including a chamber, with the connecting member further including first and second openings respectively in two ends thereof, with the first and second openings communicated with the chamber, with the connecting member further including a first assembling portion in the chamber, with the first assembling portion of the connecting member including an axial hole located in a central portion of the first assembling portion and a plurality of positioning holes disposed in a circumferential direction, with the connecting member further including a first threaded portion in the second opening, with the connecting member further including an inner periphery, an outer periphery, and a through-hole extending from the inner periphery through the outer periphery and communicated with the chamber, with the connecting member further including a first engagement portion;
an adjusting member including a pivotal end having a second assembling portion, with the first assembling portion and the second assembling portion assembled with each other, with the second assembling portion of the adjusting member including an axial coupling portion and a positioning portion, with the axial hole of the first assembling portion engaged with the axial coupling portion of the second assembling portion, with the positioning portion of the second assembling portion aligned and engaged with one of the plurality of positioning holes of the first assembling portion, with the adjusting member further including a passage, with the passage including first and second openings respectively in two ends thereof, with the first opening of the adjusting member located in the pivotal end, with the adjusting member further including a second engagement portion; and
a sealing cap in threading connection with the first threaded portion of the connecting member;
a damper coupled to the first engagement portion of the connecting member; and
a damp adjustment cylinder coupled to the second engagement portion of the adjusting member.

8. The vehicular shock absorber as claimed in claim 7, with the pivotal end of the adjusting member having a maximum outer diameter smaller than a diameter of the first opening of the connecting member, with the pivotal end of the adjusting member extending into the chamber via the first opening of the connecting member to permit assembly of the first and second assembling portions, and with the sealing cap extending into the chamber via the second opening of the connecting member to be in threading connection with the first threaded portion.

9. The vehicular shock absorber as claimed in claim 7, with the second assembling portion of the adjusting member including at least one other positioning portion, with the plurality of positioning portions disposed in a circumferential direction, with a number of the plurality of positioning portions smaller than a number of the plurality of positioning holes, with the plurality of positioning portions of the second assembling portion aligned and engaged with some of the plurality of positioning holes of the first assembling portion.

10. The vehicular shock absorber as claimed in claim 8, with the connecting member further including a second threaded portion in the first opening, with the maximum outer diameter of the pivotal end of the adjusting member smaller than a diameter of the second opening of the connecting member, with the pivotal end of the adjusting member extending into the chamber via the second opening of the connecting member to permit assembly of the first and second assembling portions, and with the sealing cap extending into the chamber via the first opening to be in threading connection with the second threaded portion.

11. The vehicular shock absorber as claimed in claim 7, wherein the damper extends in a first direction, and wherein the damp adjustment cylinder extends in a second direction not parallel to the first direction.

12. The vehicular shock absorber as claimed in claim 11, wherein the second direction is perpendicular to the first direction.

13. The vehicular shock absorber as claimed in claim 11, wherein the connecting member is disposed in the second direction, and wherein the first opening and the second opening are respectively located in two ends of the connecting member and are spaced from each other in the second direction.

14. The vehicular shock absorber as claimed in claim 7, with the damper including a third engagement portion and a groove, with the third engagement portion coupled to the first engagement portion of the connecting member, with the groove of the damper communicated with the through-hole of the connecting member, with the damper communicated with the chamber of the connecting member via the groove and the through-hole, with the damp adjustment cylinder including a fourth engagement portion and a channel, with the fourth engagement portion coupled to the second engagement portion of the adjusting member, with the channel communicated with the second opening of the passage of the adjusting member, and with the damp adjustment cylinder communicated with the chamber via the channel and the passage.

* * * * *